US005216031A

United States Patent [19]

Dobson et al.

[11] Patent Number: 5,216,031

[45] Date of Patent: Jun. 1, 1993

[54] VEGETABLE CUTTING DEVICE

[75] Inventors: William C. Dobson; David C. Belongia, both of West Bend, Wis.

[73] Assignee: The West Bend Company, West Bend, Wis.

[21] Appl. No.: 736,340

[22] Filed: Jul. 26, 1991

[51] Int. Cl.[5] ...................... A47J 17/00; A23L 1/212; A23P 1/00

[52] U.S. Cl. ........................................ 99/538; 83/865; 99/537; 99/584; 99/595

[58] Field of Search ................. 99/485, 495, 537, 538, 99/539, 567, 584, 592, 594, 595; 83/865, 862, 672, 733; 426/615, 512, 518

[56] References Cited

U.S. PATENT DOCUMENTS

| | | | |
|---|---|---|---|
| 2,156,645 | 5/1939 | Waller . | |
| 2,489,581 | 11/1949 | Mason | 99/537 |
| 2,715,927 | 8/1955 | Cupper et al. . | |
| 4,348,950 | 9/1982 | Harris . | |
| 4,581,990 | 4/1986 | Matsumoto | 99/538 |
| 4,619,192 | 10/1986 | Cycyk et al. | 99/537 |
| 4,628,808 | 12/1986 | Simon | 99/593 |
| 4,644,838 | 2/1987 | Samson et al. . | |
| 4,704,959 | 11/1987 | Scallen | 99/595 |
| 4,738,195 | 4/1988 | Berube et al. | 99/591 |
| 4,926,726 | 5/1990 | Julian | 83/865 |
| 5,010,796 | 4/1991 | Mendenhall . | |
| 5,089,286 | 2/1992 | Geissler et al. | 426/615 |
| 5,097,735 | 3/1992 | Mendenhall | 83/865 |

FOREIGN PATENT DOCUMENTS

| | | |
|---|---|---|
| 575059 | 12/1923 | France . |
| 21138 | of 1893 | United Kingdom . |

*Primary Examiner*—Timothy F. Simone
*Attorney, Agent, or Firm*—Russell L. McIlwain

[57] ABSTRACT

A vertically extending base of rectangular cross section with an upwardly opening compartment therein is telescopically received within the similarly configured downwardly opening chamber of an overlying housing. The upper end of the base removably mounts a cutter plate. The top panel of the housing removably mounts a palm-held power unit. The power unit, through a central opening in the top panel, mounts elements which secure a vegetable for rotation by the power unit as the housing is moved downwardly over the base for engagement of the vegetable progressively with the cutter plate. The components disassemble and store in nested relation to each other.

16 Claims, 5 Drawing Sheets

FIG. 1
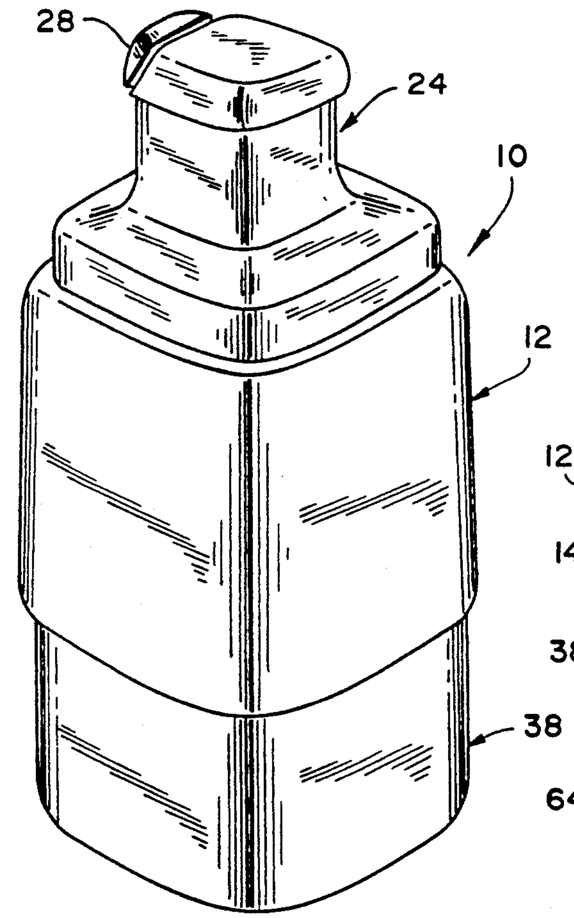
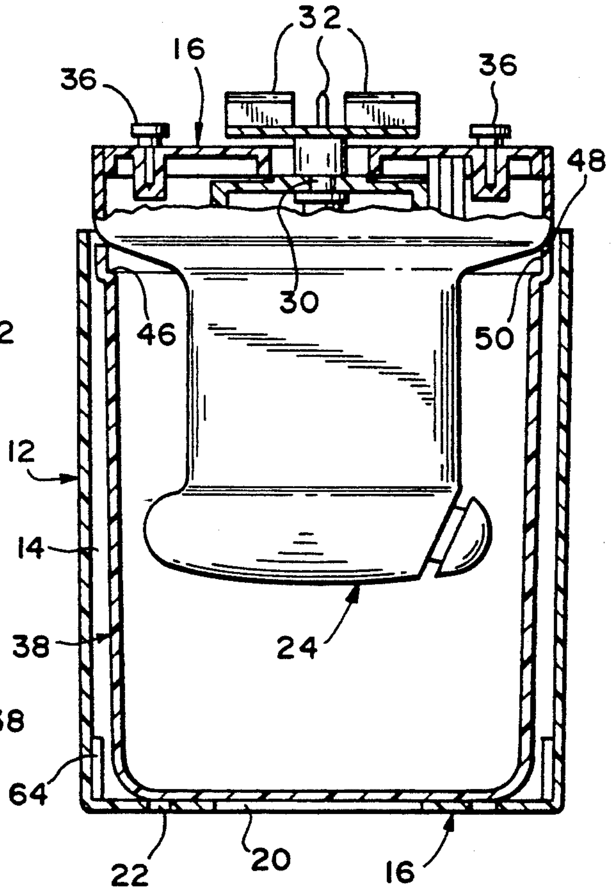
FIG. 7

FIG. 2
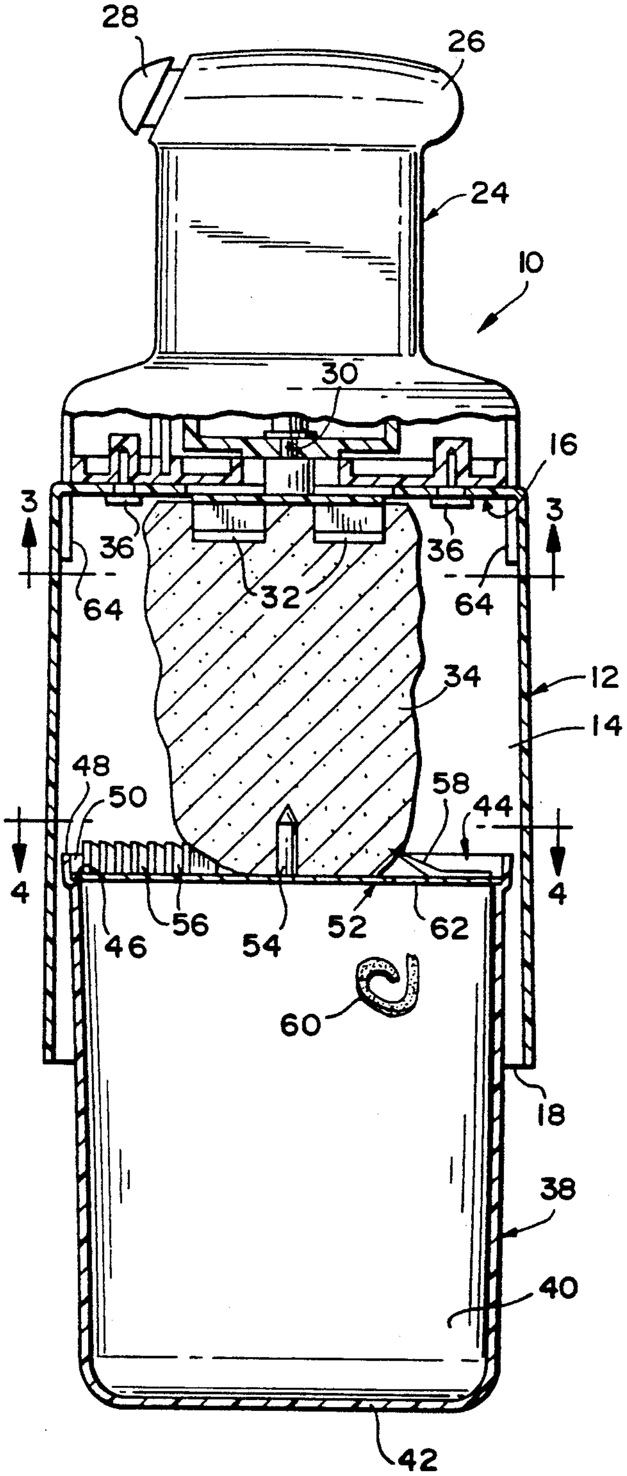
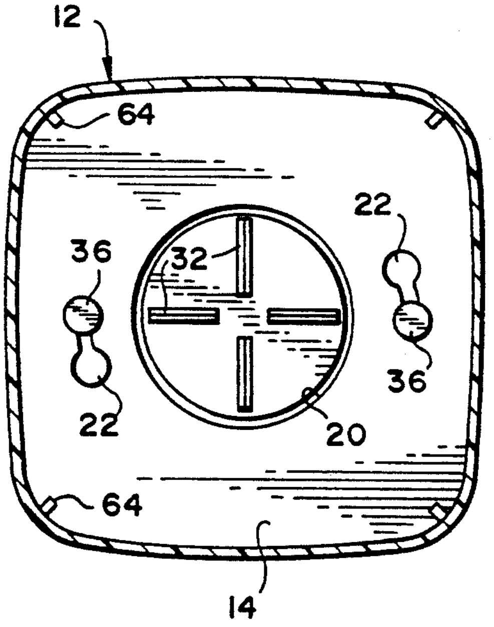
FIG. 3
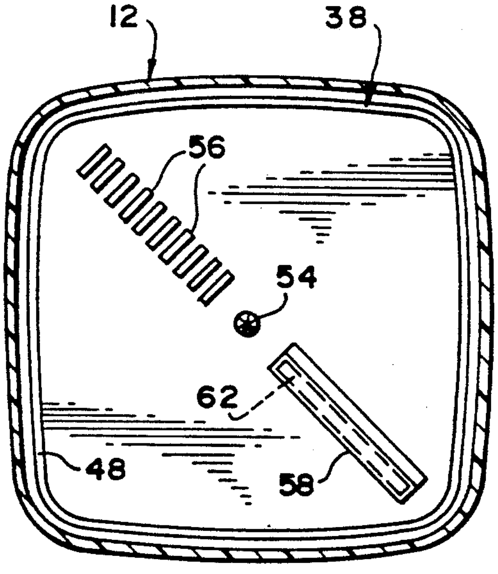
FIG. 4

FIG. 5
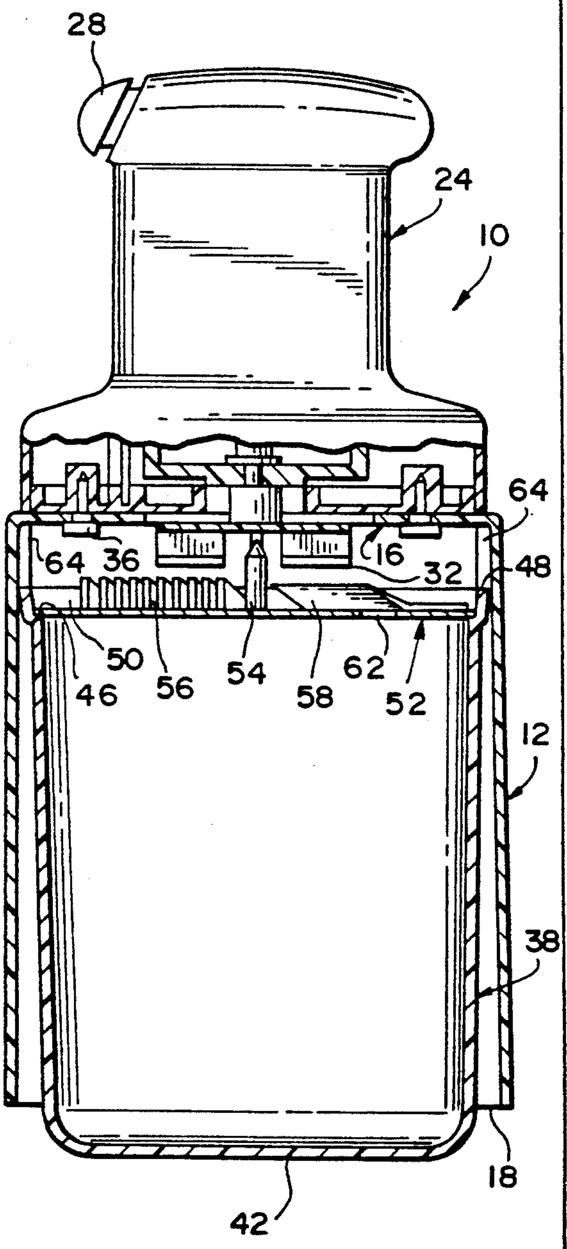
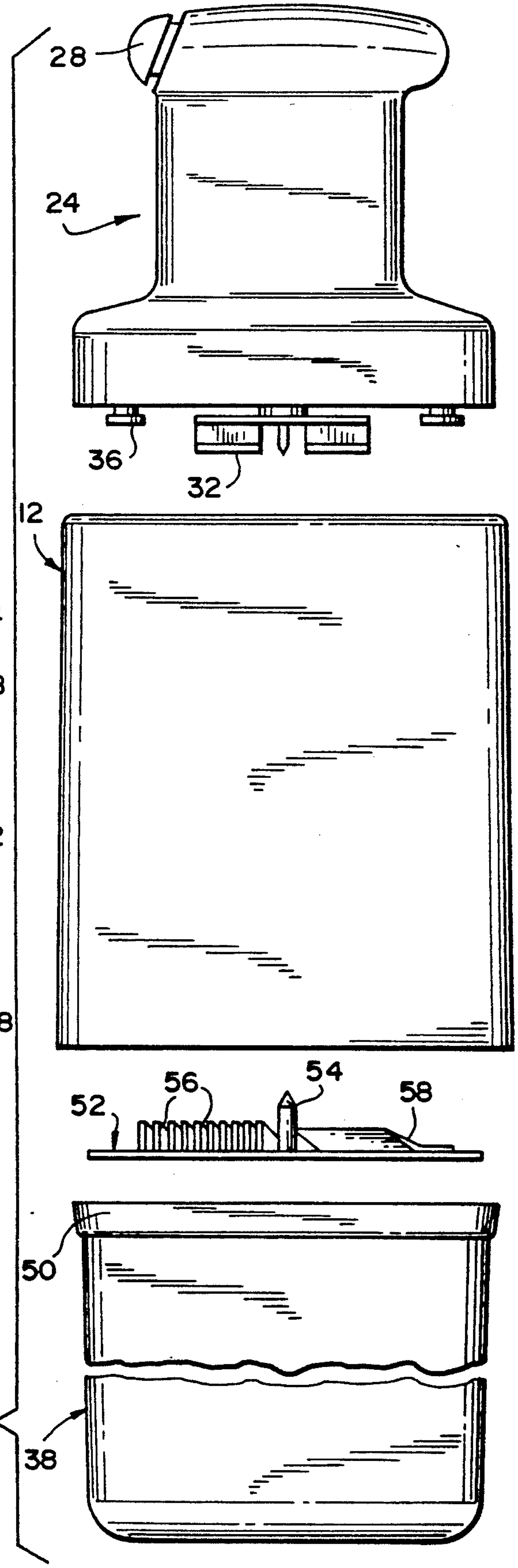
FIG. 6

FIG. 8
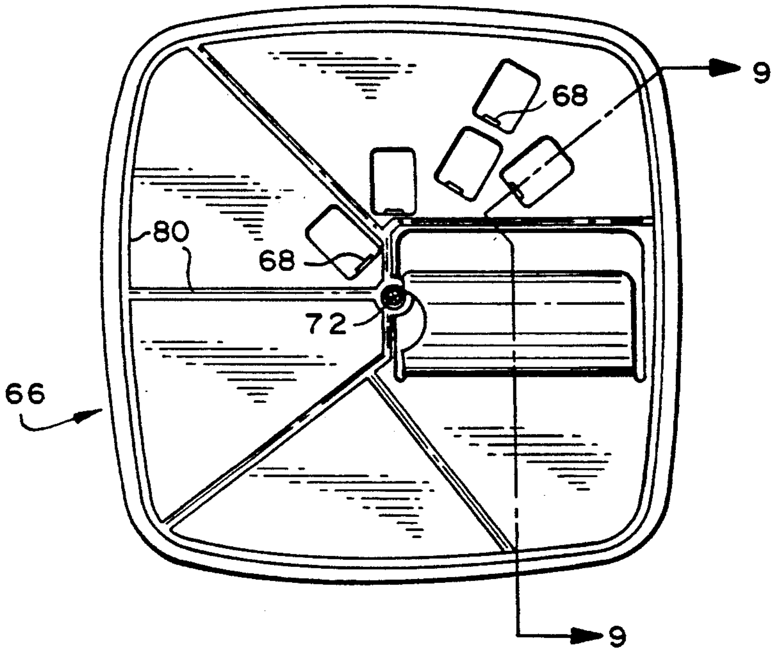
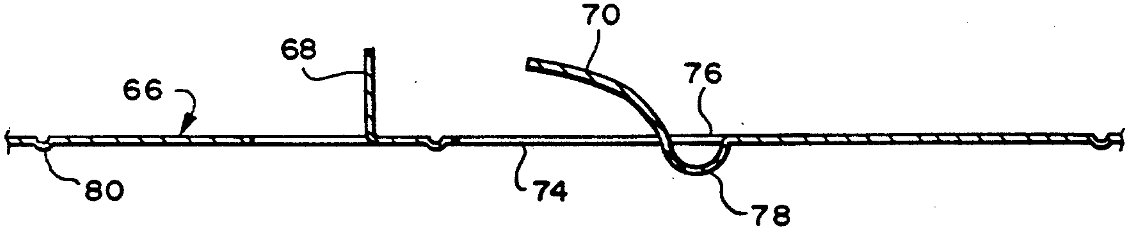
FIG. 9

VEGETABLE CUTTING DEVICE

BACKGROUND OF THE INVENTION

The present invention is broadly concerned with an implement for the cutting of a single potato or similar foodstuff into thin, elongate and preferably curled strips. Devices of this type are known as evidenced by a rather active patent art exemplified by the following patents:

| | |
|---|---|
| 1,157,013 | Lewis |
| 3,211,202 | Mason |
| 3,874,259 | Chambos et al |
| 4,619,192 | Cycyk et al |
| 4,704,959 | Scallen |

As suggested by these patents, the known devices, even those intended for the cutting of a single potato or like vegetable, are rather complex pieces of equipment which require substantial work space and are not readily adapted for the modern kitchen.

The possible exception is the device disclosed in Scallen, U.S. Pat. No. 4,704,959, which comprises a single elongate cylindrical body with a centrally mounted cutting plate and a manual feeder. However, the recessed positioning of the cutting plate and the necessity to manually operate the feeder within the cylinder itself to rotate the potato would appear to make operation of this device difficult, particularly as the cylindrical body must be grasped to prevent the entire device from rotating as the feeder is rotated. It is also to be appreciated that the necessity for manually inserting the hand within the upper portion of the cylinder to rotate the feeder could, particularly when cutting a hard potato, require the exertion of substantial effort.

SUMMARY OF THE INVENTION

The cutting implement of the invention is designed for use in a kitchen environment and is of a size to accommodate and cut a single vegetable, for example a potato. It is intended that the word "vegetable", as used herein, be considered in a generic sense as including all appropriate solid foodstuffs which are susceptible to being cut into long narrow, preferably curved strips. The principal use of the device will be as a cutter for potatoes.

The device is compact both in its operative and its stored position, requiring little counter space and providing a smooth modernistic easily cleaned interior and exterior.

The device is easily disassembled for cleaning with the disassembled components stacking within each other to further compact the unit for storage.

The cutting implements and the actual cutting operation are contained and performed in a completely enclosed chamber to avoid any accidental food discharge or, more importantly, any possible of injury to the user of the device. As an additional safety feature, the power unit mounts and rotationally drives the vegetable itself, while the cutting blades remain stationary. Another advantage of the cutting device of the invention is the incorporation of a storage compartment within the cutter-supporting base for the reception and storage of the strips as they are cut from the vegetable. The base, after the cutting operation, is easily separated from the device and the cut strips removed therefrom as from a conventional container.

Basically, the cutting implement includes an upper housing with a downwardly opening chamber therein. The upper wall or panel of the housing removably mounts an overlying hand-held power unit with vegetable-securing projections projecting from the power unit and rotatably received through the top wall of the housing for the mounting and rotatable driving of a vegetable. A base with an upwardly opening compartment therein is telescopically received within the housing chamber through the open lower end thereof. The upper mouth of the compartment includes an annular shoulder thereabout upon which the cutter plate sits. The plate and compartment mouth are rectangular to retain the plate against rotation. Similarly, both the base and the housing have complementary polygonal cross-sections, preferably rectangular, whereby rotation therebetween is precluded, thereby fixing the cutting blades against movement relative to the rotating vegetable. Multiple interchangeable cutter plates will allow use of the device to achieve a variety of different shape cut products.

The components are easily separated for cleaning and compactly store with the housing inverted to rest on its top wall, the base inserted within the housing with the base compartment upwardly opening, and the power unit inverted and received within the base compartment.

Other features and advantages of the invention will become apparent as the structural features of the invention are more fully hereinafter described.

BRIEF DESCRIPTION OF THE DRAWINGS

FIG. 1 is a perspective view of the cutting device of the invention;

FIG. 2 is an enlarged vertical cross-sectional view through the device;

FIG. 3 is a cross-sectional view taken substantially on a plane passing along line 3—3 in FIG. 2;

FIG. 4 is a cross-sectional view taken substantially on a plane passing along line 4—4 in FIG. 2;

FIG. 5 is a cross-sectional view of the device fully collapsed;

FIG. 6 is an exploded view of the device;

FIG. 7 is a cross-sectional view of the device in its stored condition;

FIG. 8 is a top plan view of a modified form of cutter plate for providing multiple thin spiral strips of cut vegetables;

FIG. 9 is an enlarged cross-sectional view taken substantially on a plane passing along line 9—9 in FIG. 8;

DESCRIPTION OF PREFERRED EMBODIMENT

Figure 10:
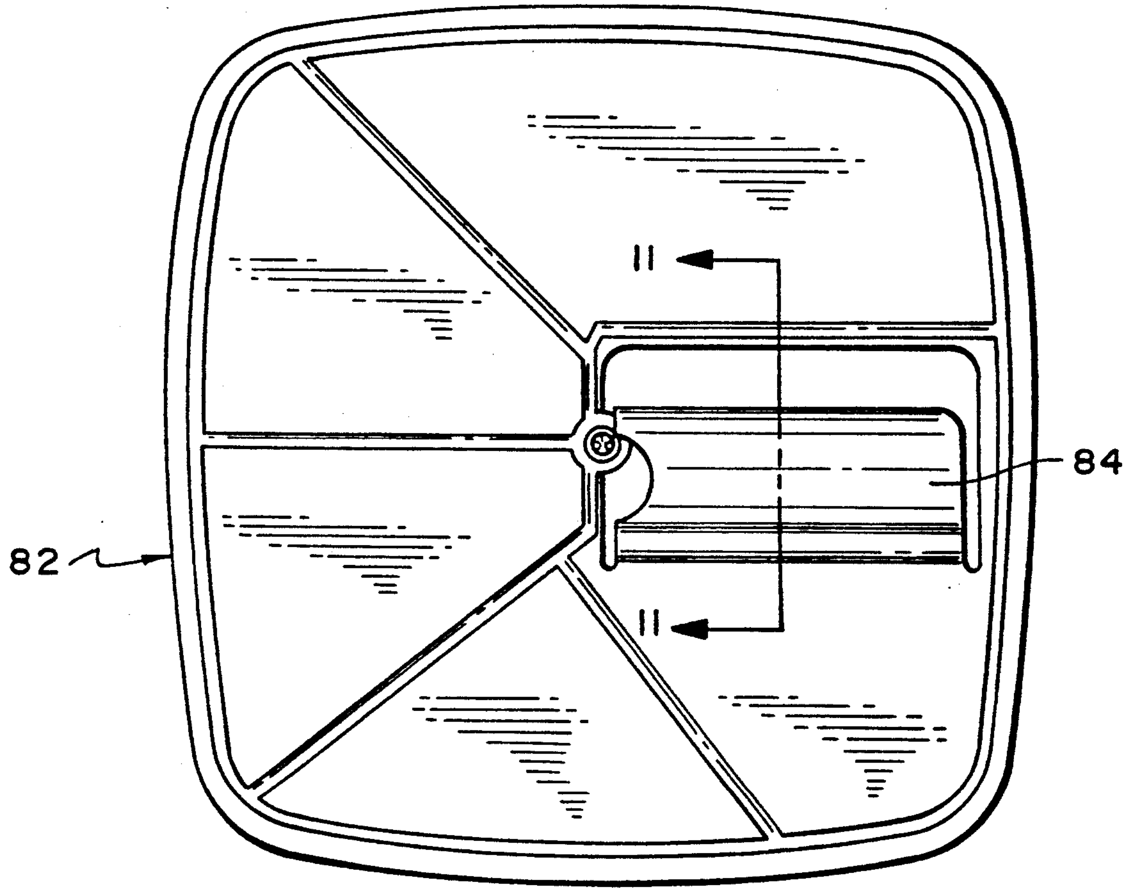
FIG. 10 is a top plan view of a further form of cutter plate formed to provide a single wide spiral product.

Referring now more specifically to the drawings, the cutting device or implement 10 includes a vertically elongate rectangular housing 12 having a rectangular internal chamber 14 therein. The chamber 14 terminates in a closed upper inner end, defined by the planar top wall or panel 16 of the housing, and has an open lower end 18.

The top panel 16 includes an enlarged central aperture 20 therethrough and a pair of diametrically opposed keyhole slots 22 therethrough.

The top panel 16 mounts the power unit 24 which includes an electric motor powered either by rechargeable internal batteries or line power through an electrical cord.

The power unit is of no greater transverse width than the top panel 16 and projects vertically to terminate in a slightly enlarged annular gripping head 26 having a projecting thumb-actuating operating switch 28. Thus configured, the power unit is easily held within a single hand and operated by the thumb of that hand.

The power unit includes a depending drive shaft 30 which, in a conventional manner, fixedly mounts projections, in the nature of blades, ribs, clips or the like 32, which are adapted to engage within and secure a potato or like vegetable 34. Preferably, the potato will have the upper end thereof sliced off to provide a planar surface to best receive the securing projections 32 and seat fully thereon. The projections 32 and the associated means for mounting the projections to the drive shaft 30 are freely received through the central opening 20 of the top panel 16 for rotation and a rotational driving of the vegetable 34 within the housing chamber 14. The power unit is locked to the top panel by a pair of headed studs or shoulder screws 36 fixed to the undersurface of the lower portion of the power unit housing and depending therefrom for rotational locking within the keyhole slots 22 upon a rotation of the power unit relative to the top panel 16. The keyhole slots are oriented relative to the rotational driving of the power unit as to maintain the locked relationship between the power unit and the top panel 16. The power unit readily disassembles for removal from the housing by a counter rotation thereof relative to the top panel.

A vertically elongate rectangular base 38 is telescopically received through the open lower end 18 of the housing for vertical movement relative to the housing 12. As suggested in FIG. 1, the housing 12, and the chamber therein, can slightly outwardly flare toward the open lower end thereof to facilitate alignment and insertion of the base 38.

The rectangular configuration of the base 38 is complementary to that of the housing chamber 14 for non-rotational reception therein. The base has an internal rectangular compartment 40 therein with the compartment 40 extending from the closed bottom or bottom panel 42 of the base to the open upper mouth 44 thereof. At or immediately inward of the open mouth of the base, the compartment is provided with an outwardly offset shoulder 46 peripherally thereabout and slightly below the extreme upper edge 48 of the base wall to define an annular retaining skirt 50.

The actual cutting of the vegetable 34 is effected by cutter plates, one of which is illustrated at 52. The plate 52 is rectangular and of a size to conform to the interior of the base compartment at the shoulder 46 for support thereon. The complementary rectangular configuration of the cutter plate and the compartment within the skirt 50 above the shoulder 46 retains the cutter plate 52 against rotation while the underlying shoulder 46 provides a stable base for the cutter plate as the vegetable 34 is forced downwardly thereagainst. The cutter plate includes a vertically projecting central stabilizing spike 54 which is cylindrical and rotatably receives the vegetable 34 as it is moved downwardly thereagainst to stabilize the vegetable during the cutting operation.

To effect the actual cutting, a series of spaced generally vertically directed blades 56 are fixed to the plate and aligned thereon outward from the center to form vertical cuts in the vegetable as it is moved downwardly thereagainst. At least one cut-off blade 58 is also fixed to the plate on a line outward from the center of the plate and angled slightly upwardly and inwardly toward the vegetable 34 to sever the vertical cut sections from the vegetable, resulting in curved strips 60 which discharge through an enlarged opening 62 in the cutter plate immediately adjacent the blade 58.

The enlarged compartment 40 of the base 38 directly receives and stores the cut strips 60, avoiding the necessity of providing a separate storage bowl or gathering the cut strips from the work surface itself.

In order to limit the downward movement of the housing 12 and power unit onto the base 38, and more particularly the cutter plate 52, depending abutments 64 are provided at least at diametrically opposed portions of the housing chamber vertically along the side walls thereof and extending sufficiently downward from the top panel 16 to engage the upper edge 48 of the wall of the base 38 prior to the point at which the vegetable-securing projections 32 would encounter the various cutting elements.

As examples of different contemplated forms of cutter plates, attention is directed to FIGS. 8-11. Turning first to FIGS. 8 and 9, the cutter plate 66 therein is formed from a single sheet of rigid material, for example stainless steel, with both the vertical-cut blades 68 and the single angled cut-off blade 70 defined integrally therefrom.

The vertical-cut blades 68 are formed by individual tabs severed on three sides from the plate and upwardly bent at right angles thereto. Each of the blades 68 is oriented in the plane of travel of the vegetable thereover, as with the previously described blades 56. As such, and in order to accommodate the tab-defining cutouts, the cutouts are, as best seen in FIG. 8, circumferentially spaced and progressively outwardly offset or spaced from the central spike 72 rigid with the plate 66. The particular pattern of the cutouts forming the blades 68 may vary, the only requirement being the spacing and the retention of the basic structural integrity of the plate 66.

The angled cut-off blade 70, aligned outward from the center spike 72, is in a following position relative to the cut-off blades 68 with the cutout defining the blade 70 providing a vertical opening or passage 74 below the cutting edge of the blade 70 for reception of the severed vegetable strips. Noting FIG. 9, it will be appreciated that the angular orientation of the blade 70 will assist in the downward discharge of the cut materials.

To enhance the structural integrity of the connection of the blade 70 with the plate 66, the blade 70, at the joinder area 76 with the plate 66, can include a full width arcuate rigidifying and force-absorbing deformation 78 projecting slightly below the plate 66.

The plate 66 itself is rigidified by formed depressions therein which define strengthening ribs 80. These ribs 80 will preferably extend peripherally about and immediately inward of the generally rectangular outer edge of the plate, and generally radially outward from the center of the plate to the peripheral rib, including a rib immediately forward of the relatively large opening 74 from which the cut-off blade 70 is defined.

Figure 11:
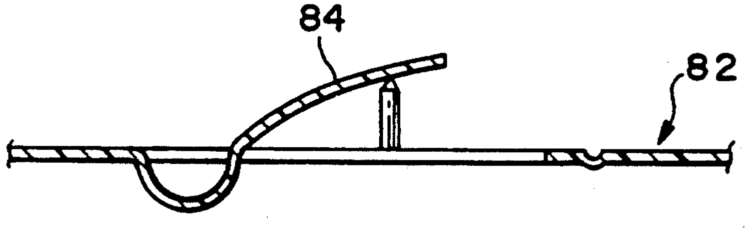
FIG. 11 is a cross-sectional detail taken substantially on a plane passing along line 11—11 in FIG. 10.

Referring now to FIGS. 10 and 11, the cutter plate 82 therein is formed in the same manner as the cutter plate 66 differing therefrom only in the provision of the single cut-off blade 84 and the elimination of the multiple vertical-cut blades designated as 68 in the previously described cutter plate 66.

So formed, the cutter plate 82, rather than providing multiple thin strips, will form a continuous wide spiral cut.

In actual use, the vegetable 34 is introduced through the open end 18 of the housing 12 and forcibly engaged with the retaining projections 32. The housing 12, with the vegetable 34 therein, is then engaged over the base, the power unit activated, and the housing unit, through a grasping of the power unit 24, moved downward with the power rotated vegetable sliced into distinct curled strips 60 which discharge into the storage compartment 40.

As an alternative to the above manner of positioning the vegetable, the vegetable can be initially engaged with the centering spike 54, after which the housing is positioned thereover, and downwardly engaged with sufficient force to fix the projections 32 into the upper end of the vegetable to positively retain the vegetable upon actuation of the power unit for rotation of the vegetable relative to the cutting elements.

The operation of the device requires the use of only a single hand which not only activates the power unit but also stabilizes the device during operation.

Upon completion of the cutting operation, the power unit and housing are vertically removed from the base, the cutter unit or plate lifted from the support shoulder 46, and the base used in the manner of a conventional container from which the collected strips can be taken or poured.

Complete disassembly includes the further step of counter rotating the power unit relative to the housing for a disengagement of the headed studs 32 from the keyhole slots 22, thus exposing all of the components for a simplified cleaning thereof.

Noting FIG. 7, the disassembled components can, after cleaning, be compactly stored by inverting the housing 12, inserting the base 38 therein with the base compartment 40 opening upwardly, and finally, by inverting the power unit 24 and seating the power unit within the compartment 40. The cutter plate, as above noted, will normally be one of a series of plates designed to provide differently cut strips or the like, and can be conveniently stored in an appropriate rack.

The foregoing is considered illustrative of the features of the invention, and such obvious variations as may occurred to those skilled in the art are considered to be within the scope of the invention.

We claim:

1. A cutting device for cutting strips from a solid foodstuff, said device comprising foodstuff securing means for receiving and securing foodstuff, drive means engaged with said securing means for a rotational driving thereof and a corresponding rotation of secured foodstuff, cutter means for cutting foodstuff, support means for supporting said foodstuff securing means and said cutter means in spaced alignment with and for selective movement toward each other with foodstuff therebetween for movement of the foodstuff and said cutter means into cutting engagement, said support means comprises an upper housing mounting said drive means and a lower base telescopically receiving said housing for vertical movement therebetween, means for precluding relative rotation between said housing and said base, said housing including a top plan and defining a downwardly opening chamber therebelow for receiving foodstuff to be cut, means for positioning said foodstuff securing means in said chamber to engage foodstuff therein, said base comprising a receptacle with a closed bottom and an upwardly opening mouth, cutter mounting means for removably positioning said cutter means in overlying relation to said receptacle mouth, said cutter means including passage means therethrough for passage of cut foodstuff therethrough for vertical discharge toward said closed bottom of said receptacle and collection in said receptacle, said receptacle, upon removal of said cutter means, forming a self-contained storage container for the cut foodstuff.

2. The cutting device of claim 1 wherein said cutter means comprises a plate with multiple blades projecting therefrom, said cutter mounting means comprising seat means defined peripherally about said receptacle mouth and receiving said plate thereon, said plate and said seat means being configured to preclude relative rotation therebetween.

3. The cutting device of claim 2 wherein said housing and said base are of complementary cross-sectional configurations which define said means precluding relative rotation between said housing and said base.

4. The cutting device of claim 3 wherein said housing and said base cross-sectional configurations are substantially rectangular.

5. The cutting device of claim 4 wherein said drive means comprises an electric power unit, and means for releasably mounting said power unit to said housing for selective removal therefrom.

6. The cutting device of claim 1 wherein said cutter means comprises a plate with at least one integral portion of said plate being partially severed from said plate and laterally directed relative to said plate to define a cutting blade for cutting engagement with foodstuff moved thereagainst.

7. The cutting device of claim 6 wherein said plate includes deformed portions linearly therein and defining reinforcing ribs.

8. The cutting device of claim 7 wherein said plate, immediately adjacent to and in alignment with said one blade, having an enlarged opening defined therethrough for the passage of foodstuff cut by said blade.

9. The cutting device of claim 8 wherein said plate includes a center, said blade and said associated opening being elongate outward from said center, and a series of vertical-cut blades sequentially outwardly spaced from said plate center and defined by integral portions of said plate partially severed and laterally folded therefrom.

10. The cutting device of claim 1 wherein, for storage, said housing is inverted with said top panel lowermost, said receptacle being received within said housing with said receptacle closed bottom overlying said housing top panel and said receptacle mouth opening upward, and said power unit, removed from said housing, being received within said receptacle through said mouth.

11. A cutting device for cutting strips from a solid foodstuff, said device comprising foodstuff securing means for receiving and securing foodstuff, drive means engaged with said securing means for a rotational driving thereof and a corresponding rotation of secured foodstuff, cutter means for cutting foodstuff, support means for supporting said foodstuff securing means and said cutter means in spaced alignment with and for selective movement toward each other with foodstuff therebetween for movement of the foodstuff and said cutter means into cutting engagement, said support means comprises an upper housing mounting said drive means and a lower base telescopically receiving said housing for vertical movement therebetween, means for precluding relative rotation between said housing and said base, said housing including a top panel and defining a downwardly opening chamber therebelow for receiving foodstuff to be cut, means for positioning said foodstuff securing means in said chamber to engage foodstuff therein, said base comprising a receptacle with a compartment defined therein, said compartment having an upwardly opening mouth, cutter mounting means positioning said cutter means in overlying relation to said compartment, said cutter means including passage means therethrough for passage of cut foodstuff therethrough and into said compartment, said cutter means comprising a plate with multiple blades projecting therefrom, said cutter mounting means comprising seat means defined peripherally about said compartment mouth and receiving said plate thereon, said plate and said seat means being configured to preclude relative rotation therebetween said housing and said base being of complementary substantially rectangular cross-sectional configurations which define said means precluding relative rotation between said housing and said base, said drive means comprising an electric power unit, and means for releasably mounting said power unit to said housing for selective removal therefrom, said power unit being vertically elongate with an upper gripping head and a lower portion, said means for releasably mounting said power unit extending from said lower portion and engaging said power unit to said housing top panel, said foodstuff securing means depending from said lower portion, said means for positioning said foodstuff securing means in said chamber including an opening through said housing top panel receiving said securing means therethrough.

12. The cutting device of claim 11 wherein, for storage, said base is receivable within said housing with said base compartment opening outward, and said power unit, removal from said housing, is receivable within said base compartment.

13. The cutting device of claim 11 wherein said drive means comprises an electric power unit, and means for releasably mounting said power unit to said housing top panel for selective removal therefrom.

14. The cutting device of claim 1 wherein said housing and said base are of complementary substantially rectangular cross-sections, and define said means for precluding relative rotation between said housing and said base.

15. A cutting device for cutting strips from a solid foodstuff, said device comprising foodstuff securing means for receiving and securing foodstuff, drive means engaged with said securing means for a rotational driving thereof and a corresponding rotation of secured foodstuff, cutter means for cutting foodstuff, support means for supporting said foodstuff securing means and said cutter means in spaced alignment with and for selective movement toward each other with foodstuff therebetween for movement of the foodstuff and said cutter means into cutting engagement, said support means comprises an upper housing mounting said drive means and a lower base telescopically receiving said housing for vertical movement therebetween, means for precluding relative rotation between said housing and said base, said housing including a top panel and defining a downwardly opening chamber therebelow for receiving foodstuff to be cut, means for positioning said foodstuff securing means in said chamber to engage foodstuff therein, said base comprising a receptacle with a compartment defined therein, said compartment having an upwardly opening mouth, cutter mounting means positioning said cutter means in overlying relation to said compartment, said cutter means including passage means therethrough for passage of cut foodstuff therethrough and into said compartment, said drive means comprising an electric power unit, and means for releasably mounting said power unit to said housing for, selective removal therefrom, said power unit being vertically elongate with an upper gripping head and a lower portion, said means for releasably mounting said power unit extending from said lower portion and engaging said power unit to said housing top panel, said foodstuff securing means depending from said lower portion, said means for positioning said foodstuff securing mans in said chamber including an opening through said housing top panel receiving said securing means therethrough.

16. The cutting device of claim 15 wherein, for storage, said base is receivable within said housing with said base compartment opening outward, said power unit, removed from said housing, is receivable within said base compartment.

* * * * *